(12) United States Patent
Åberg et al.

(10) Patent No.: US 9,052,765 B2
(45) Date of Patent: Jun. 9, 2015

(54) METHOD FOR OPERATING A TOUCH SENSITIVE USER INTERFACE

(75) Inventors: Peter Åberg, Vinslöv (SE); Gunnar Klinghult, Lund (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 0 days.

(21) Appl. No.: 14/239,214

(22) PCT Filed: Aug. 31, 2011

(86) PCT No.: PCT/EP2011/004389
§ 371 (c)(1),
(2), (4) Date: Mar. 20, 2014

(87) PCT Pub. No.: WO2013/029641
PCT Pub. Date: Mar. 7, 2013

(65) Prior Publication Data
US 2014/0210760 A1     Jul. 31, 2014

(51) Int. Cl.
*G06F 3/041*     (2006.01)

(52) U.S. Cl.
CPC ............. *G06F 3/041* (2013.01); *G06F 3/0414* (2013.01); *G06F 3/0416* (2013.01); *G06F 2203/04104* (2013.01); *G06F 2203/04105* (2013.01)

(58) Field of Classification Search
CPC ............... H04M 1/72547; H04M 1/72519; H04M 1/7253; H04M 1/575; H04M 1/72597; H04M 2250/60; H04M 2250/22; H04M 1/0216; H04M 1/0237; H04M 1/04; H04M 1/274558; H04M 2001/274541; H04M 2250/02; G06F 3/04883; G06F 3/04886; G06F 3/041; G06F 3/0488; G06F 3/0416; G06F 3/017; G06F 3/044; G06F 3/0414; G06F 2203/04105; G06F 2203/04808; G06F 3/04842; G06F 3/0484; G06F 1/1626; G06F 1/3218; G06F 2203/04809; G06F 1/1643; G06F 1/1658; G06F 1/169; G06F 3/016; G06F 2203/04104; G02B 2027/0187; G02B 27/017; G02B 2027/0138; G02B 2027/014; G02B 2027/0178; G02B 27/0179; G02B 2027/0118; G02B 2027/0123; G02B 27/0093; G02B 27/0172; G02B 27/2214
USPC .......................................... 345/173–181, 156
See application file for complete search history.

(56) References Cited

U.S. PATENT DOCUMENTS

| 2010/0053116 | A1* | 3/2010 | Daverman et al. ............ 345/175 |
| 2011/0141053 | A1  | 6/2011 | Bulea et al. |
| 2011/0291951 | A1* | 12/2011 | Tong .............................. 345/173 |

FOREIGN PATENT DOCUMENTS

EP     2241955     10/2010

OTHER PUBLICATIONS

International Search Report and Written Opinion from corresponding Application No. PCT/EP2011/004389, mailed on Jun. 1, 2012.

*Primary Examiner* — Duc Dinh
(74) *Attorney, Agent, or Firm* — Renner, Otto, Boisselle & Sklar, LLP.

(57) ABSTRACT

A method for operating a touch sensitive user interface is provided. The touch sensitive user interface comprises a touch sensitive surface (3) and at least two force sensitive sensors (15-66). The touch sensitive surface (3) is configured to provide a touch information indicating touch positions (6, 8) of at least two concurrent touches (5, 7) on the touch sensitive surface (3). The at least two force sensitive sensors (15- 66) are mounted at the touch sensitive surface (3) at different predetermined locations (11-14). Each of the at least two force sensitive sensors (15-66) is configured to generate a corresponding force information depending on a force being exerted on the corresponding force sensitive sensor (15-66). According to the method, the touch positions (6, 8) are determined based on the touch information and the force information is received from the at least two force sensitive sensors (15-66). Based on the at least two touch positions (6, 8), the force information from the force sensitive sensors (15-66) and the predetermined locations (11-14) of the force sensitive sensors (15-66) a corresponding touch force is determined for each of the concurrent touches (5, 7).

10 Claims, 3 Drawing Sheets

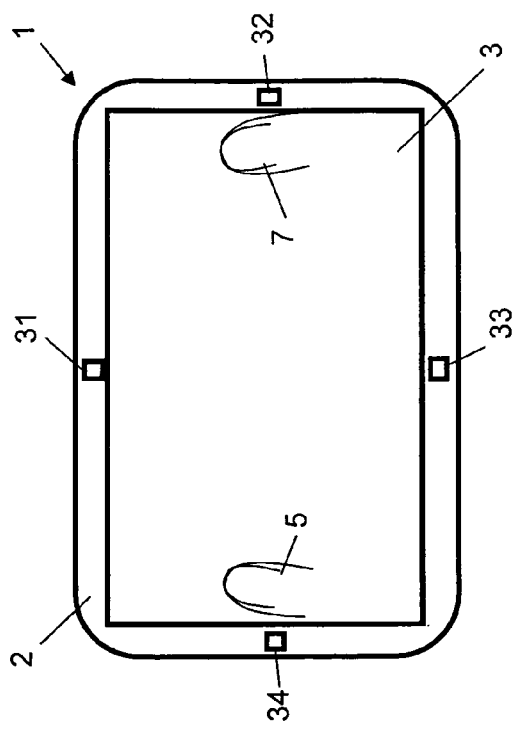
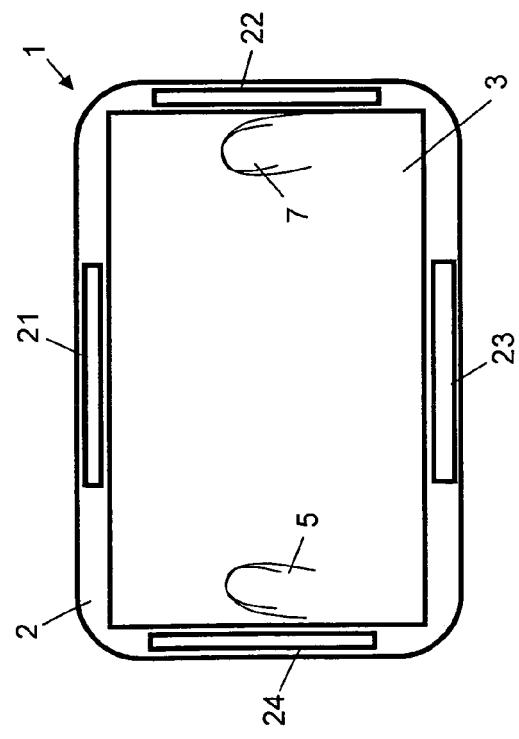

METHOD FOR OPERATING A TOUCH SENSITIVE USER INTERFACE

FIELD OF THE INVENTION

The present application relates to a method for operating a touch sensitive user interface, especially a touch sensitive user interface of a mobile portable device. The present application relates furthermore to a touch sensitive user interface and a device comprising a touch sensitive user interface.

BACKGROUND OF THE INVENTION

Applications for consumer products, especially gaming applications, are getting more complex. Furthermore, these applications are getting available also on mobile devices, for example mobile phones or mobile gaming devices, as the processing power of these mobile device increases. Today, input methods based on a touch panel input, for example a so-called touch screen comprising a touch sensitive surface, are utilized to recognize two-dimensional inputs. Furthermore, a multi touch recognition is also commonly utilized, for example for recognizing multiple fingers touching the touch sensitive surface at different locations of the touch sensitive surface.

However, there is a need to provide new input methods adapted to provide more complex input information in a convenient and intuitive way.

SUMMARY OF THE INVENTION

According to the present invention, this object is achieved by a touch sensitive user interface, a method for operating a touch sensitive user interface and a device as defined in the independent claims. The dependent claims define preferred and advantageous embodiments of the invention.

According to an aspect of the present invention, a method for operating a touch sensitive user interface is provided. The touch sensitive user interface comprises a touch sensitive surface and at least two force sensitive sensors. The touch sensitive surface is configured to provide a touch information indicating touch positions of at least two concurrent touches on the touch sensitive surface. The touches may result from a user touching the touch sensitive surface with their fingers, with a stylus, or with a plurality of styluses. The at least two force sensitive sensors are mounted at the touch sensitive surface at different predetermined locations. Each of the at least two force sensitive sensors is configured to generate a corresponding force information depending on a force being exerted on the corresponding force sensitive sensor. According to the method, the touch positions of the at least two concurrent touches on the touch sensitive surface are determined based on the touch information. Furthermore, the force information from the at least two force sensitive sensors is received and for each of the at least two concurrent touches a corresponding touch force is determined based on the at least two touch positions, the force information from the at least two force sensitive sensors and the predetermined locations of the at least two force sensitive sensors.

By determining for each of the at least two concurrent touches a corresponding touch force, a new input dimension can be achieved when a user is touching the touch sensitive surface. This new dimension is substantially perpendicular to the touch sensitive surface. Therefore, a three-dimensional input can be accomplished. The force information may be used for example for scrolling in long lists displayed on a display of the touch screen comprising the touch sensitive surface or for zooming a content displayed on the display. When a long list of items is displayed on the display, a scrolling position may be varied based on the force information, for example the items may be scrolled down with an increasing force. When zooming a view on the display, a zoom factor may be varied based on the force information. Furthermore, certain predefined activities may be triggered when the force exceeds a predetermined threshold. For example, a screen lock may be unlocked, or a preview of a picture or a video may be presented, or a pre-listening of an audio file may be output when a symbol representing the picture, video or audio file is pressed with at least a predetermined force. In gaming applications, for example in a car racing gaming application, an analog speed control and an analog brake control may be accomplished by determining touch forces applied by the user to predefined items displayed on the display. Similar analog controls, even more than two, may be used in other gaming applications, for example in wrestling games, football games and so on. The at least two force sensitive sensors may be comprised within one sensor module, sensor system or sensor material adapted to provide at least two force information for two different locations.

According to an embodiment, the step of determining for each of the at least two concurrent touches a corresponding touch force comprises the following steps. First, a subset of the at least two force sensitive sensors is determined based on the force information and the predetermined locations of the at least two force sensitive sensors. Next, for each of the at least two concurrent touches a corresponding force is determined based on the at least two touch positions, the force information from the force sensitive sensors of the subset, and the predetermined locations of the at least two force sensitive sensors.

For example, when much more than two force sensitive sensors are provided at the touch sensitive surface, it may be sufficient to take into account only a subset of the force sensitive sensors to determine a touch force for each touch position. For example, only the highest and lowest force values from the plurality of force sensitive sensors may be used. Furthermore, also the position of each touch position may be used to determine the subset of force sensitive sensors to be used for calculating the touch force for each of the touch positions. By taking into account only a subset of the force sensitive sensors, a calculation of the touch forces for each of the touch positions may be simplified.

According to another embodiment, the touch sensitive surface comprises a capacitive touch sensitive surface. Capacitive touch sensitive surfaces are widely used in consumer products, especially mobile phones, and may be combined with force sensitive sensors. Furthermore, other commonly used input methods may be used, e.g. based on a resistive touch detection or an optical touch detection or an infrared touch detection.

According to a further embodiment, the touch sensitive surface comprises a display for outputting visual information on the touch sensitive surface. Thus, the touch sensitive surface constitutes together with the display a so-called touch screen on which items or controls may be displayed to be touched by a user.

According to an embodiment, the force sensitive sensors comprise compression force sensitive sensors arranged to detect a force substantially perpendicular to the touch sensitive surface. The touch sensitive sensors may be arranged between the touch sensitive surface and a housing of a device comprising the touch sensitive user interface. Compression force sensitive sensors, for example based on a piezoelectric effect or a pressure controlled resistor may be easily arranged between the touch sensitive surface and the housing without requiring a large installation space. For example, the force sensitive sensors may be located at a periphery of the touch sensitive surface. The touch sensitive surface may be supported at the periphery by a plurality of force sensitive sensors. Furthermore, the force sensitive sensors may be arranged at predetermined locations below the touch sensitive surface. Therefore, the force sensitive sensors may be arranged at a suitable and appropriate location taking into account the installation spaces available in the device.

According to another embodiment, the touch sensitive surface is substantially rectangular with four circumferential sides. Furthermore, at least one force sensitive sensor is located at each of the four sides. In such an arrangement, the touch sensitive surface can be reliably supported via the force sensitive sensors and an accurate determination of the force information for each of the touch positions can be determined from the force sensitive sensors.

According to another aspect of the present invention, a touch sensitive user interface is provided. The touch sensitive user interface comprises a touch sensitive surface, at least two force sensitive sensors, and a processing unit. The touch sensitive surface is configured to provide a touch information indicating touch positions of at least two concurrent touches on the touch sensitive surface. Starting times of the two touches may be different. The at least two force sensitive sensors are mounted at the touch sensitive surface at different predetermined locations. The at least two force sensitive sensors may be mounted at other locations where forces applied to the touch sensitive surface may be measured, e.g. at a frame supporting the touch sensitive surface. Each of the at least two force sensitive sensors is configured to generate a corresponding force information depending on a force being exerted on the corresponding force sensitive sensor. The processing unit is coupled to the touch sensitive surface and the at least two force sensitive sensors. The processing unit is configured to determine the touch positions of the at least two concurrent touches on the touch sensitive surface based on the touch information from the touch sensitive surface. Furthermore, the processing unit is configured to determine or calculate for each of the at least two concurrent touches a corresponding touch force based on the at least two touch positions, the force information from the at least two force sensitive sensors, and the predetermined locations of the at least two force sensitive sensors. Thus, the touch sensitive user interface provides not only touching positions of multiple touches on the touch sensitive surface, but also a force information for each of the touch positions indicating a force exerted at the corresponding touch position. This additional information concerning the force of the touch on the touch sensitive surface for each touch position may be used as a further control information for an application communicating to the user via the touch sensitive user interface.

According to an embodiment, the touch sensitive user interface is adapted to perform the above-described method.

According to another aspect of the present invention a device comprising the above-described touch sensitive user interface is provided. The device may comprise for example a mobile phone, a personal digital assistant, a mobile music player or a navigation system. The touch sensitive user interface providing not only the touching positions of multiple touches on the touch sensitive user interface, but providing additionally for each touch position a corresponding touch force, enables a user interface for the device for inputting comprehensive and complex control information in an easy and intuitive way.

Although specific features described in the above summary and the following detailed description are described in connection with specific embodiments, it is to be understood that the features of the embodiments may be combined with each other unless specifically noted otherwise.

BRIEF DESCRIPTION OF THE DRAWINGS

The invention will now be described in more detail with reference to the accompanying drawings.

FIGS. 2-5 show arrangements of force sensitive sensors in a mobile device according to embodiments of the present invention.

DETAILED DESCRIPTION OF PREFERRED EMBODIMENTS

In the following, exemplary embodiments of the present invention will be described in more detail. It has to be understood that the following description is given only for the purpose of illustrating the principles of the invention and is not to be taken in a limiting sense. Rather, the scope of the invention is defined only by the appended claims and is not intended to be limited by the exemplary embodiments hereinafter.

It is to be understood that the features of the various exemplary embodiments described herein may be combined with each other unless specifically noted otherwise. Same reference signs in the various drawings and the following description refer to similar or identical components.

Figure 1:
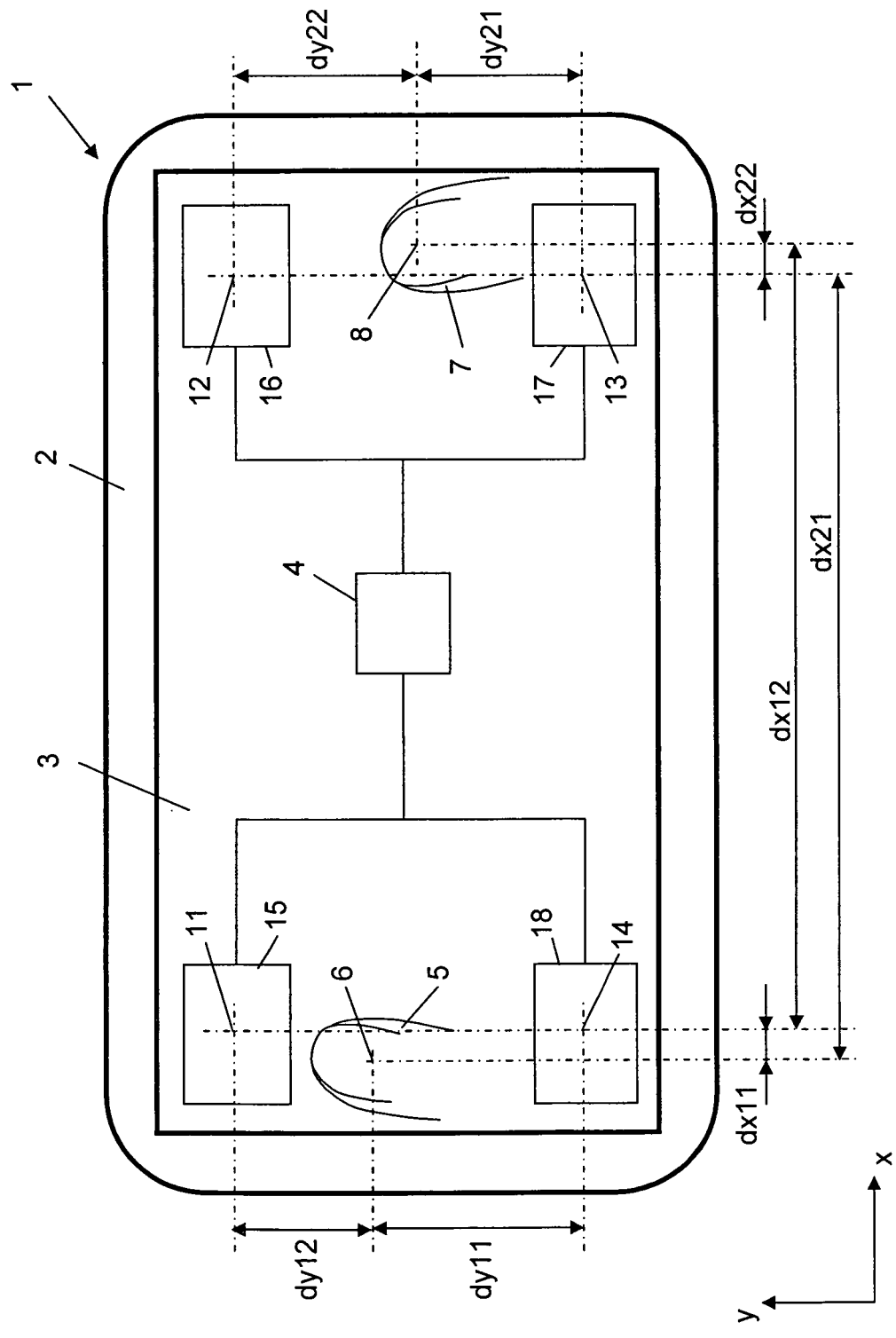
FIG. 1 shows schematically a mobile device according to an embodiment of the present invention.

FIG. 1 shows a mobile device 1. The mobile device 1 may be for example a mobile phone, a mobile gaming device, a mobile media player, or a mobile navigation system. The mobile device 1 comprises a housing 2 and a touch screen 3. The touch screen 3 comprises a display, for example a graphical color display, and a touch sensitive surface. The touch sensitive surface may be a touch sensitive surface of a capacitive type as it is known in the art. The mobile device 1 comprises furthermore a processing unit 4 and four force sensitive sensors 11-14. The mobile device 1 may comprise a lot more components, for example a microphone, a loudspeaker, control knobs, an antenna, a battery, and a transceiver for mobile telephone communication, but these additional components are not shown in FIG. 1 for clarity matters. The processing unit 4 is coupled to the touch sensitive surface of the touch screen 3 and to the force sensitive sensors 11-14. The force sensitive sensors 11-14 are configured to generate a corresponding force information depending on a force being exerted on the corresponding force sensitive sensor. The force sensitive sensors 11-14 may be pressure sensitive sensors. The force sensitive sensors 11-14 are arranged between a backside of the touch screen 3 and the housing 2. The force sensitive sensors may also be arranged at other appropriate locations. Thus, a force being exerted on the touch screen 3 may be detected by the force sensitive sensors 11-14. Operation of the mobile device 1 will be described in the following in more detail.

Assuming a user touches with their fingers 5, 7 the touch screen 3, the processing unit 4 will recognize two touch positions 6, 8 corresponding to centers of a contact between the fingers 5, 7 and a surface of the touch screen 3. For example, the processing unit 4 may determine an x-position and a y-position of each of the touch positions 6, 8. Furthermore, center locations 11-14 of the force sensitive sensors 15-18 are known by the processing unit 4. Based on this location information the processing unit 4 may calculate for example a distance in x and y direction from each touch position 6, 8 to each center 11-14 of the force sensitive sensors 15-18. For example, a distance dx11 between the touch position 6 and the centers 11, 14 of the force sensitive sensors 15 and 18 in the x direction can be determined as shown in FIG. 1. Furthermore, the distances dx12, dx21, dx22 and dy11, dy12, dy21, dy22 may be determined by the processing unit 4 from the location information 11-14 and the touch positions 6, 8. Based on the force information from the force sensitive sensors 15-18 and the determined distances between the touch positions 6, 8 and the centers 11-14 of the force sensitive sensors 15-18 the processing unit 4 is able to determine a force being exerted by finger 5 at the touch position 6 and a force being exerted by finger 7 at the touch position 8. The touch positions 6, 8 and the corresponding forces exerted at these touch positions 6, 8 may be used in an application executed by the mobile device 1. For example, in a car racing gaming application, the force applied to touch position 8 may be used to control a speed of a car and a force applied to the touch position 6 may be used to control a brake of the car.

How much touch positions may be distinguished at the same time depends on the features of the touch screen 3 and an arrangement of the force sensitive sensors. In FIGS. 2-5 alternative arrangements of force sensitive sensors are shown. The force sensitive sensors shown in FIGS. 2-5 are located at a periphery of the touch screen 3. However, the force sensitive sensors shown in FIGS. 2-5 are adapted to detect a force being exerted on the touch screen 3 with respect to the housing 2.

In FIG. 2 four force sensitive sensors 21-24 are arranged such that on each circumferential side of the touch screen 3 one force sensitive sensor is arranged.

In FIG. 3 four force sensitive sensors 31-34 are also arranged at the four circumferential sides of the touch screen 3 but the force sensitive sensors 31-34 are considerably smaller than the force sensitive sensors 21-24 of FIG. 2.

Figure 4:
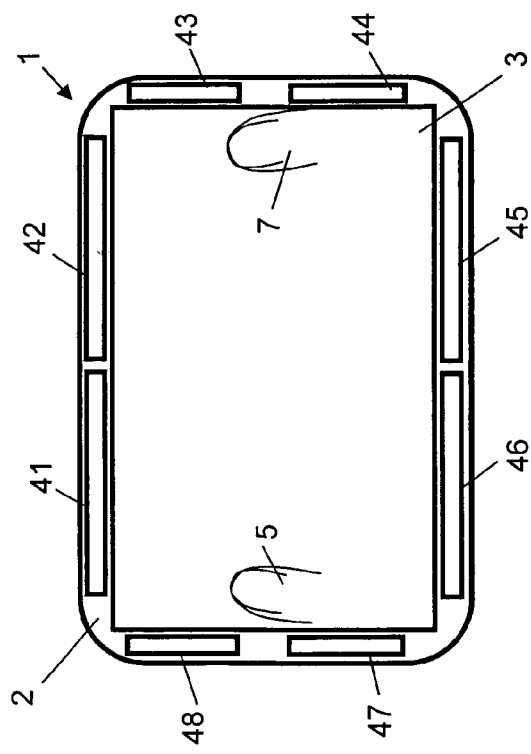

In FIG. 4 a mobile device 1 is shown comprising eight force sensitive sensors 41-48. On each circumferential side of the touch screen 3 there are two force sensitive sensors located. This may provide a much higher resolution for detecting touch forces for more than two touch positions.

Figure 5:
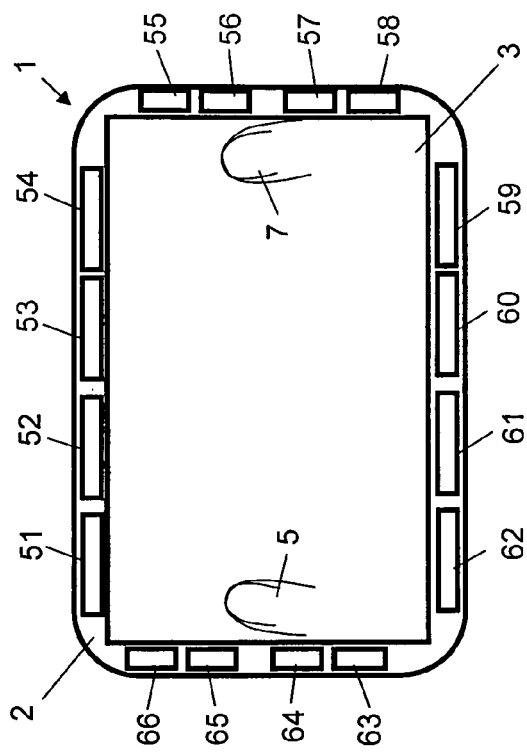

The mobile device 1 in FIG. 5 provides sixteen force sensitive sensors 51-66. On each circumferential side of the touch screen 3 four force sensitive sensors are provided. Especially when a large number of force sensitive sensors are provided, for example as shown in FIG. 5, an algorithm running in the processing unit 4 may decide to use only a subset of the force information provided by the force sensitive sensors 51-66. For example, only highest and lowest force values from the different force sensitive sensors 51-66 may be used and a calculation of the forces applied at the touch positions may be performed based on this subset. Furthermore, the touch positions determined by the touch screen 3 may be taken into consideration to determine a subset of force information from the force sensitive sensors 51-66 which are relevant to the determined touch positions. For example, only the force information from the force sensitive sensors being arranged nearest to the touch positions may be considered for calculating the touch force for each of the touch positions. For example, for calculating the force exerted on the touch screen 3 by finger 7 in FIG. 5 may be determined mainly on force information from force sensitive sensors 55-59.

While exemplary embodiments have been described above, various modifications may be implemented in other embodiments. For example, the force sensitive sensors may be arranged such that some of the force sensitive sensors are arranged below the touch screen 3, as shown in FIG. 1, and some force sensitive sensors are arranged at a periphery of the touch screen 3, as shown in FIGS. 2-5. Furthermore, the force sensitive sensors may be arranged in an asymmetric way if appropriate.

Finally, it is to be understood that all the embodiments described above are considered to be comprised by the present invention as it is defined by the appended claims.

The invention claimed is:

1. A method for operating a touch sensitive user interface, the touch sensitive user interface comprising a touch sensitive surface and at least two force sensitive sensors, wherein the touch sensitive surface is configured to provide a touch information indicating touch positions of at least two concurrent touches on the touch sensitive surface, wherein the at least two force sensitive sensors are mounted at the touch sensitive surface at different predetermined locations, wherein each of the at least two force sensitive sensors is configured to generate a corresponding force information depending on a force being exerted on the corresponding force sensitive sensor, the method comprising the steps of:

determining the touch positions of the at least two concurrent touches on the touch sensitive surface based on the touch information, receiving the force information from the at least two force sensitive sensors, determining a subset of the at least two force sensitive sensors, the subset comprising a force sensitive sensor indicating a lowest force value of the at least two force sensitive sensors and a force sensitive sensor indicating a highest force value of the at least two force sensitive sensors, and determining for each of the at least two concurrent touches a corresponding touch force based on the at least two touch positions, the force information from the force sensitive sensors of the subset, and the predetermined locations of the at least two force sensitive sensors.

2. The method according to claim 1, wherein the touch sensitive surface comprises at least one of a group comprising a capacitive touch sensitive surface, an optical touch sensitive surface, an infrared touch sensitive surface, and a resistive touch sensitive surface.

3. The method according to claim 1, wherein the touch sensitive surface comprises a display for outputting visual information on the touch sensitive surface.

4. The method according to claim 1, wherein the force sensitive sensors comprise compression force sensitive sensors arranged to detect a force substantially perpendicular to the touch sensitive surface.

5. The method according to claim 1, wherein the touch sensitive sensors are arranged between the touch sensitive surface and a housing of a device comprising the touch sensitive user interface.

6. The method according to claim 1, wherein the predetermined locations of the at least two force sensitive sensors comprise locations at a periphery of the touch sensitive surface.

7. The method according to claim 1, wherein the touch sensitive surface is substantially rectangular with four circumferential sides, and wherein at least one force sensitive sensor is located at each of the four sides.

8. A touch sensitive user interface, comprising:
a touch sensitive surface configured to provide a touch information indicating touch positions of at least two concurrent touches on the touch sensitive surface,
at least two force sensitive sensors mounted at the touch sensitive surface at different predetermined locations, each of the at least two force sensitive sensors being configured to generate a corresponding force information depending on a force being exerted on the corresponding force sensitive sensor, and a processing unit coupled to the touch sensitive surface and the at least two force sensitive sensors and configured to determine the touch positions of the at least two concurrent touches on the touch sensitive surface based on the touch information from the touch sensitive surface, determine a subset of the at least two force sensitive sensors, the subset comprising a force sensitive sensor indicating a lowest force value of the at least two force sensitive sensors and a force sensitive sensor indicating a highest force value of the at least two force sensitive sensors, and determine for each of the at least two concurrent touches a corresponding touch force based on the at least two touch positions, the force information from the force sensitive sensors of the subset, and the predetermined locations of the at least two force sensitive sensors.

9. A device comprising a touch sensitive user interface according to claim 8.

10. The device according to claim 9, wherein the device comprises at least one device of a group consisting of a mobile phone, a personal digital assistant, a mobile music player, and a navigation system.

* * * * *